United States Patent
Cao et al.

(10) Patent No.: US 8,923,623 B2
(45) Date of Patent: Dec. 30, 2014

(54) METHOD AND APPARATUS FOR ACQUIRING DESCRIPTIVE INFORMATION OF A PLURALITY OF IMAGES AND IMAGE MATCHING METHOD

(75) Inventors: Qiong Cao, Beijing (CN); Rujie Liu, Beijing (CN); Hao Yu, Beijing (CN); Masahiko Sugimura, Kawasaki (JP); Yusuke Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 200 days.

(21) Appl. No.: 13/434,065

(22) Filed: Mar. 29, 2012

(65) Prior Publication Data
US 2012/0251010 A1    Oct. 4, 2012

(30) Foreign Application Priority Data
Mar. 31, 2011   (CN) ........................ 2011 1 0085705

(51) Int. Cl.
G06K 9/46      (2006.01)
G06K 9/68      (2006.01)

(52) U.S. Cl.
CPC ............ *G06K 9/4671* (2013.01); *G06K 9/6857* (2013.01)
USPC ............ 382/201; 382/195; 382/103; 382/159

(58) Field of Classification Search
CPC ..... G06K 9/18; G06K 9/4609; G06K 9/6203; G06T 7/0081; G06T 5/001
USPC .................. 382/201, 195, 103, 159
See application file for complete search history.

(56) References Cited

U.S. PATENT DOCUMENTS

2012/0294477 A1* 11/2012 Yang et al. .............. 382/103
2013/0121587 A1*  5/2013 Brandt ...................... 382/195

FOREIGN PATENT DOCUMENTS

| CN | 101315663 A | 12/2008 |
| CN | 101923653   | 12/2010 |

OTHER PUBLICATIONS

Lazebnik et al: "Beyond Bags of Features: Spatial Pyramid Matching for Recognizing Natural Scene Categories", IEEE, 2006.*
Christian Wallraven, et al., "Recognition with Local Features: the Kernel Recipe", 2003.
Kristen Grauman, et al., "The Pyramid Match Kernel: Discriminative Classification with Sets of Image Features" Oct. 2005.
Bangpeng Yao, et al., "Mining Discriminative Adjectives and Prepositions for Natural Scene Recognition" 2009, pp. 100-106.
Emrah Ergul, et al., "Scene Classification Using Spatial Pyramid of Latent Topics" 2010, pp. 3603-3606.

(Continued)

*Primary Examiner* — Ruiping Li
(74) *Attorney, Agent, or Firm* — Staas & Halsey LLP

(57) ABSTRACT

The invention provides a method and apparatus for acquiring descriptive information of a plurality of images and an image matching method. The method for acquiring descriptive information of a plurality of images includes: performing a feature point detection with respect to each image of the plurality of images, so as to obtain a plurality of feature points of each image; acquiring 0-level descriptive information of the plurality of images; and the following steps are performed for each image: performing a division of the image for the (n−1)th time, so as to obtain a plurality of (n−1)-level sub-images of the image; and (n−1)-level descriptive information of the image is generated in accordance with a plurality of nth local feature descriptors for the image and a plurality of nth visual words, where n=2,3, . . . , K+1, and K is a positive integer.

16 Claims, 6 Drawing Sheets

(56) References Cited

OTHER PUBLICATIONS

Chinese Office Action issued May 16, 2014 in corresponding Chinese Patent Application No. 201110085705.4.

"Retrieval to image database based on color features with pyramid construction", Wang et al., Computer Engineering and Design, vol. 26, No. 4, Apr. 2005, pp. 1041-1047.

"Beyond Bags of Features: Spatial Pyramid Matching for Recognizing Natural Scene Categories", Lazebnik et al., 2006 IEEE Computer Society Conference on Computer Vision and Pattern Recognition, 8 pp.

"Patch Based Medical Image Classification with SPM", Chen et al., China Academic Journal Electronic Publishing House, pp. 12-18.

* cited by examiner

METHOD AND APPARATUS FOR ACQUIRING DESCRIPTIVE INFORMATION OF A PLURALITY OF IMAGES AND IMAGE MATCHING METHOD

CROSS REFERENCE TO RELATED APPLICATIONS

This application claims the benefit of Chinese Application No. 201110085705.4, filed Mar. 31, 2011, the disclosure of which is incorporated herein by reference.

FIELD

The present invention generally relates to the field of image processing and particular to a method and apparatus for acquiring descriptive information of an image.

BACKGROUND

Along with the development of information technologies, large databases have been increasingly found in the field of multimedia applications, e.g., image file management, industry image/video supervision, medical image diagnoses, etc. Rapid image retrieval and recognition in connection with a large database has also consequently become an important issue of study.

A traditional image description method based upon a "bag of words" works well to address this issue and has been widely applied. For example, such an image description method based upon a bag of words has been introduced, for example, in "Recognition with local features: the kernel recipe" by C. Wallraven, et al in Proc. ICCV, Vol. 1 pp 257-264, 2003, where representative "visual words" are extracted from a large number of local features of an image and the frequencies that these visual word appear in the image are used to describe the image. Also a description method based upon a multilayer image spatial structure has been proposed in order to address a limited description of the feature with respect to spatial information. A method for describing an image in the form of a spatial pyramid has been disclosed in "Pyramid match kernels: Discriminative classification with sets of image features" by K, Grauman, et al in Proc. ICCV, 2005.

SUMMARY

In view of the foregoing problem present in the prior art, it is an object of the invention to provide a novel multilayer image description method based upon a bag of dynamic words, which can describe an image accurately at different spatial layers.

Another object of the invention is to provide an image matching method which can match an image flexibly.

According to an aspect of the invention, there is provided a method for acquiring descriptive information of a plurality of images, which includes:

a detection step for performing a feature point detection with respect to each image of the plurality of images, so as to obtain a plurality of feature points of each image;

a first acquisition step for acquiring 0-level descriptive information of the plurality of images, wherein the 0-level descriptive information of each image of the plurality of images is generated in accordance with a plurality of first local feature descriptors for the image and a plurality of first visual words, wherein the plurality of first local feature descriptors are obtained on the basis of the plurality of feature points of the image and the plurality of first visual words are obtained on the basis of the plurality of first local feature descriptors for the plurality of images; and an nth acquisition step for acquiring (n−1)-level descriptive information of the plurality of images, wherein the following steps are performed for each image:

an (n−1)th division sub-step, for performing a division of the image for the (n−1)th time, so as to obtain a plurality of (n−1)-level sub-images of the image; and an nth acquisition sub-step, in which (n−1)-level descriptive information of the image is generated in accordance with a plurality of nth local feature descriptors for the image and a plurality of nth visual words, wherein the plurality of nth local feature descriptors are obtained on the basis of each feature point of the image, the plurality of nth visual words are obtained on the basis of the plurality of nth local feature descriptors for the plurality of images, and each of the nth local feature descriptors for the image are obtained in accordance with corresponding (n−1)-level sub-images where the respective feature points lie, where n=2,3, . . . , K+1, and K is a positive integer.

According to another aspect of the invention, there is provided an image matching method. This method includes obtaining a plurality of similarity degrees by matching an input image with each of a plurality of images, respectively, in which the obtainment of each similarity degree comprising: comparing 0-level descriptive information through K-level descriptive information of the input image with 0-level descriptive information through K-level descriptive information of a corresponding image among the plurality of images respectively, so as to obtain a plurality of matching degrees including a 0-level matching degree through a K-level matching degree; and obtaining the similarity degree in accordance with a weighted sum of the plurality of matching degrees, where K is a positive integer, wherein the 0-level descriptive information through K-level descriptive information of each of the plurality of images are obtained by the method according to the invention;

the 0-level descriptive information of the input image is obtained in accordance with a plurality of 0-level local feature descriptors for the input image and the plurality of first visual words, in which the plurality of 0-level local feature descriptors are obtained on the basis of a plurality of feature points included in the input image;

(n−1)-level descriptive information of the input image is obtained by performing the following steps for the input image, where n=2, 3, . . . , K+1:

dividing the input image for the (n−1)th time, so as to obtain a plurality of (n−1)-level sub-images; and generating (n−1)-level descriptive information of the input image in accordance with the plurality of nth visual words and a plurality of n-level local feature descriptors for the input image which are obtained on the basis of the plurality of feature points of the input image, wherein each of the plurality of n-level local feature descriptors are obtained in accordance with corresponding (n−1)-level sub-images of the input image where the respective feature points lie, and the comparison of 1-level descriptive information is performed only when the 0-level matching degree is greater than or equal to a predetermined threshold value, and the comparison of n-level descriptive information is performed only when an (n−1)-level matching degree is greater than or equal to the predetermined threshold value.

According to another aspect of the invention, there is provided an apparatus for acquiring descriptive information of a plurality of images, which includes:

a detection unit configured to perform a feature point detection for each image of the plurality of images, so as to obtain a plurality of feature points of each image;

a first acquisition unit for acquiring 0-level descriptive information of the plurality of images, configured to generate, for each image, the 0-level descriptive information of the image in accordance with a plurality of first local feature descriptors for the image and a plurality of first visual words, wherein the plurality of first local feature descriptors are obtained on the basis of the plurality of feature points of the image, and the plurality of first visual words are obtained on the basis of the plurality of first local feature descriptors for the plurality of images; and an nth acquisition unit for acquiring (n−1)-level descriptive information of the plurality of images, comprising:

an (n−1)th division sub-unit configured to perform, for each image, a division of the image for the (n−1)th time, so as to obtain a plurality of (n−1)-level sub-images of the image; and an nth acquisition sub-unit configured to generate, for each image, (n−1)-level descriptive information of the image in accordance with a plurality of nth local feature descriptors for the image and a plurality of nth visual words, wherein each of the plurality of nth local feature descriptors are obtained on the basis of respective feature points of the image and corresponding (n−1)-level sub-images where the respective feature points lie, and the plurality of nth visual words are obtained on the basis of the plurality of nth local feature descriptors for the plurality of images, where n=2,3, . . . , K+1, and K is a positive integer.

According to a still another aspect of the invention, there is provided a program product in which machine readable instruction codes are stored, where the instruction codes when being read and executed can perform the foregoing method for acquiring descriptive information of a plurality of images according to an embodiment of the invention.

According to a further aspect of the invention, there is provided a storage medium in which the foregoing program product is borne.

The invention generates a series of descriptors for each feature point as opposed to a traditional method in which only one local feature descriptor is derived for each feature point. Therefore an image can be described accurately at different spatial layers.

Furthermore an image can be matched in a sequence of from a coarse layer to a fine layer and the image will be matched at the layer m only if an image is matched with another image at the layer m−1 to some extent above a predetermined threshold. Therefore the image can be matched flexibly.

BRIEF DESCRIPTION OF DRAWINGS

The foregoing and other objects, aspects and advantages of the invention will become more apparent from the following description of embodiments of the invention with reference to the drawings in which identical or like technical features or components will be denoted with identical or like reference numerals.

DESCRIPTION OF EMBODIMENTS

Figure 1:
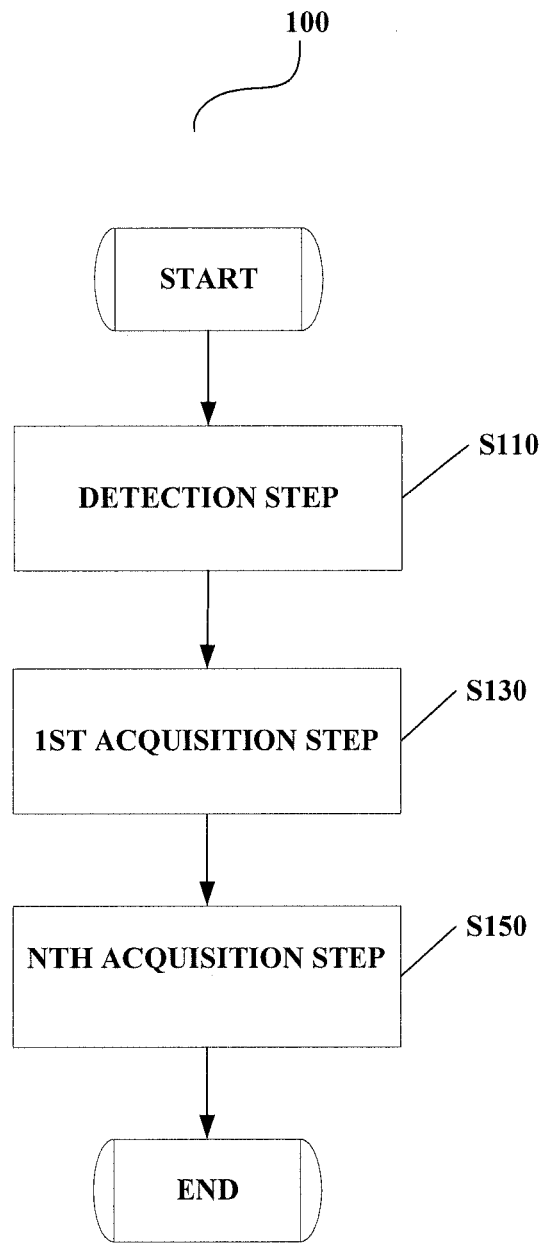
FIG. 1 is a simplified flow chart illustrating a method for acquiring descriptive information of a plurality of images according to an embodiment of the invention.

Embodiments of the invention will be described below with reference to the drawings. An element and a feature described in a figure of the drawings or one embodiment of the invention can be combined with an element and a feature illustrated in one or more other figures or embodiments. It shall be noted that a representation and a description of components and processes irrelevant to the invention and well known to those ordinarily skilled in the art will be omitted in the drawing and the description for the sake of clarity.

In an embodiment of the invention, in order to acquire sufficient image feature information, an image is divided into a plurality layers, local feature descriptors are calculated at the respective spatial layers, respective visual words are generated respectively from the corresponding local feature descriptors for the respective spatial layers ranging from a coarse layer to a fine layer, and a valid multilayer description of the image is derived from the corresponding visual words at the respective spatial layers.

By contrast, in the methods of prior art, only one local feature descriptor is calculated for each feature point, so what is generated is regarded as a static visual word, and such a static visual word may not be applicable to a description of an image feature at different spatial layers.

FIG. 1 is a simplified flow chart illustrating a method 100 for acquiring descriptive information of a plurality of images according to an embodiment of the invention. As illustrated in FIG. 1, firstly feature point detection is performed with respect to each image of the plurality of images so as to obtain a plurality of feature points of each image in the detection step S110. The number of feature points depends upon, for example, the characteristic of the image, the performance of a processor retrieving and recognizing an image using the descriptive information, etc. The number of feature points can be selected by a user from a menu or otherwise dependent upon the need of an application. Alternatively those skilled in the art can determine the reasonable number of feature points dependent upon the performance of a processor using the description information and through sampling and testing so that a period of time for acquiring the descriptive information will fall into a user acceptable range. The feature points can be detected in a well-known method, e.g., a Harris corner detector, through sampling edge pixels, etc.

Next 0-level descriptive information of the plurality of images is acquired in a first acquisition step S130. Specifically the 0-level descriptive information of each image of the plurality of images is generated in accordance with a plurality of local feature descriptors (first local feature descriptors) for the image and a library of visual words (a plurality of first visual words), where the plurality of local feature descriptors are obtained on the basis of the plurality of feature points of the image and the library of visual words is obtained on the basis of the local feature descriptors for the respective images.

In an embodiment, a local feature descriptor for each of the plurality of feature points of the image is calculated so as to obtain the plurality of local feature descriptors for the image. For example a Scale Invariant Feature Transform (SIFT) feature can be extracted in an SIFT extraction method, a shape context descriptor for the feature point can be calculated, or a statistic of a matrix of the relative positions and angular relationships between the feature point and other pixel points in the image can be generated. Then the local feature descriptors for the respective images are put together to generate a library of visual words. The library of visual words can be obtained, for example, in a k-means clustering method. For example the local feature descriptors for the respective feature points of the image are k-means clustered, the value of each cluster center corresponds a visual word, and the values of the k cluster centers and the serial numbers of their corresponding visual words are stored as a library of visual words, where k is a natural number which typically ranges from 500 to 1000. Next the plurality of local feature descriptors for the image are made correspond respectively to the corresponding visual words in the library of visual words so that the 0-level descriptive information of the image is generated by generating a statistic of the frequencies that the respective visual words in the library of visual words appear in the image. A visual word mapping method can be applied to each of the images so that the local feature descriptors for the respective feature points of the image can be mapped to the corresponding visual words. For example for each of the feature points, the Euclidean distances between the local feature descriptor for the feature point and the values of the respective cluster centers corresponding to the respective visual words in the visual words library are calculated to find the serial number of the visual word with the smallest Euclidean distance to represent the feature point; and a statistic of the numbers of times that the serial numbers of the respective visual words appear in the image is generated so as to describe the image using a histogram of visual words.

The process proceeds to an nth acquisition step S150 for acquiring (n−1)-level descriptive information of the plurality of images, where n=2, 3, . . . , K+1, and K is a positive integer. Specifically the following steps are performed for each of the images: an (n−1)th division sub-step for performing a division of the image for the (n−1)th time so as to obtain a plurality of (n−1)-level sub-images of the image; and an nth acquisition sub-step in which (n−1)-level descriptive information of the image is generated in accordance with a plurality of nth local feature descriptors for the image and a plurality of nth visual words, where the plurality of nth local feature descriptors are obtained on the basis of the plurality of feature points of the image, the plurality of nth visual words are obtained on the basis of the plurality of nth local feature descriptors for the plurality of images, and each of the nth local feature descriptors for the image is obtained in accordance with corresponding (n−1)-level sub-images where the respective feature points lie.

Figure 2:
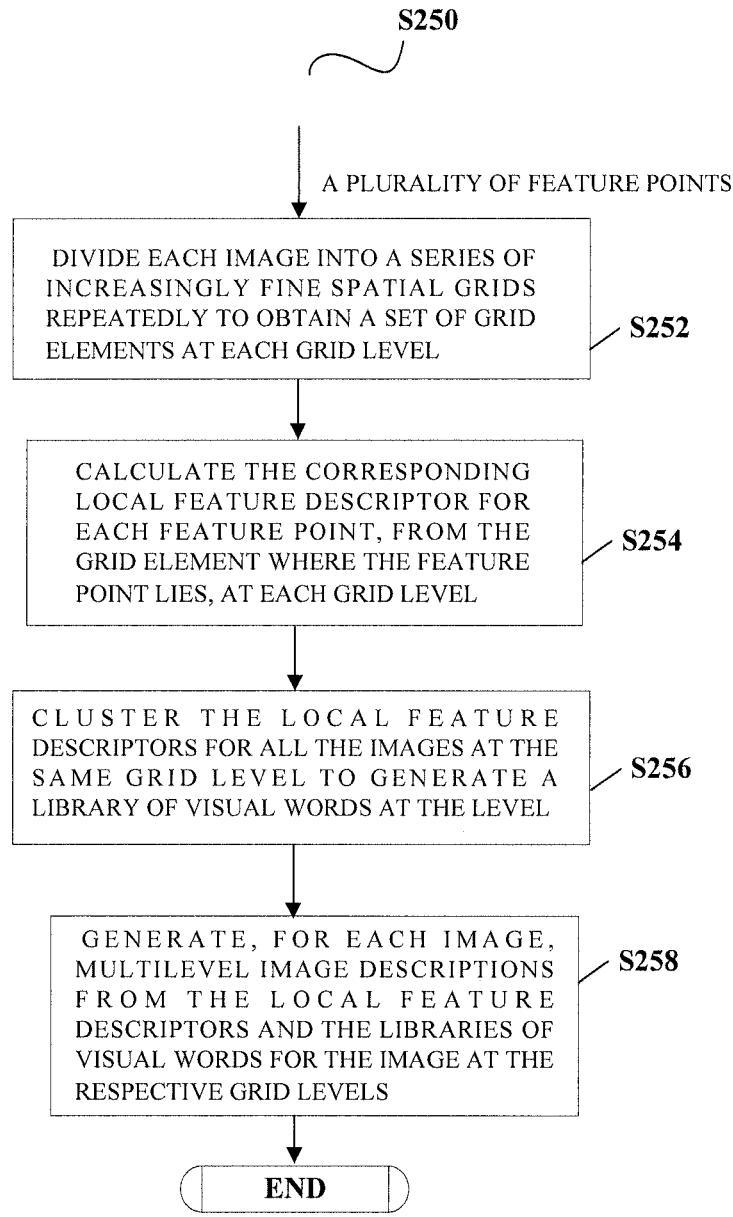
FIG. 2 is a simplified flow chart illustrating a specific example in which an nth acquisition step illustrated in FIG. 1 is performed.

Reference will be made below to FIG. 2 to describe a simplified flow chart of a specific example S250 for achieving the nth acquisition step S150 (n=2, 3, . . . , K+1) in FIG. 1. That is, the specific example S250 includes K steps from a second acquisition step to a (K+1)th acquisition step. As illustrated in FIG. 2, each of the images is divided into a series of increasingly fine spatial grids repeatedly for a number K of times to obtain K sets of grid elements (sub-images) of the image respectively at the first to Kth grid levels in the step S252. The number of times for dividing may be set by the user or determined according to practical application. For example, a 4×4 rectangular grid or a circular grid can be used as a spatial grid. Next in the step S254, the corresponding local feature descriptor for each of the feature points is calculated, from the grid element where the feature point lies, at each of the grid levels to obtain the local feature descriptors for the respective images at the grid level. For example a shape context descriptor for the feature point can be calculated in the grid element or a statistic of a matrix of the relative positions and angular relationships between the feature point and other pixel points in the grid element can be generated.

In a preferred embodiment, for some acquisition steps among the second acquisition step to the (K+1)th acquisition step, an additional detection step for detecting an additional feature point can be added before the step S252 so as to describe the image more accurately.

The process proceeds to the step S256 for clustering (e.g., k-means clustering, etc.) the local feature descriptors for all the images at the same grid level to generate a library of visual words at the grid level. Thus there are different libraries of visual words at the different grid levels.

Then for each of the images, 1- to K-levels image descriptions are generated from the local feature descriptors and the libraries of visual words for the image at the respective grid levels in the step S258. Specifically at each of the grid levels, the local feature descriptors for the image at the grid level are made correspond respectively to the corresponding visual words in the library of visual words at the level. For example the local feature descriptors for the image at the grid level are mapped in a visual word mapping method to the corresponding visual words in the library of visual words at the level. Next for each of the grid elements of the image at the grid level, descriptive information of the grid element, e.g., a histogram of visual words, etc., is generated by generating a statistic of the frequencies that the respective visual words in the library of visual words appear in the grid element; and the descriptive information of all the grid elements at the grid level is combined, for example, the respective histograms of visual words are connected sequentially into a long histogram to obtain descriptive information of the image at the grid level. Alternatively descriptive information of the image at the grid level can be generated by generating directly a statistic the frequencies that the respective visual words in the library of visual words at the level appear in the image.

Figure 3:
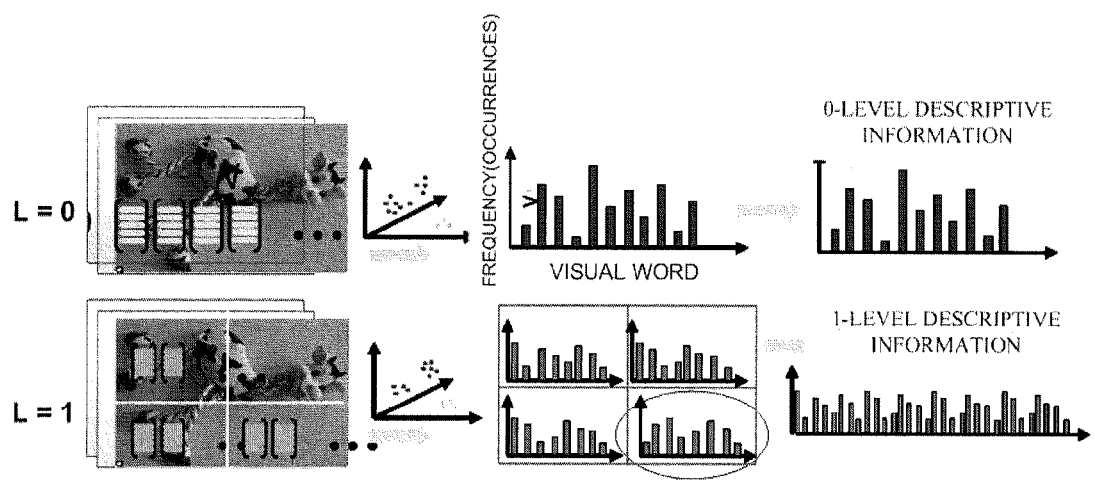
FIG. 3 is a schematic diagram illustrating two-level descriptive information of an image.

FIG. 3 is a schematic diagram illustrating two-level descriptive information of an image. In FIG. 3, descriptive information in a circle is a histogram of visual words of a grid element (a sub-image).

Figure 4:
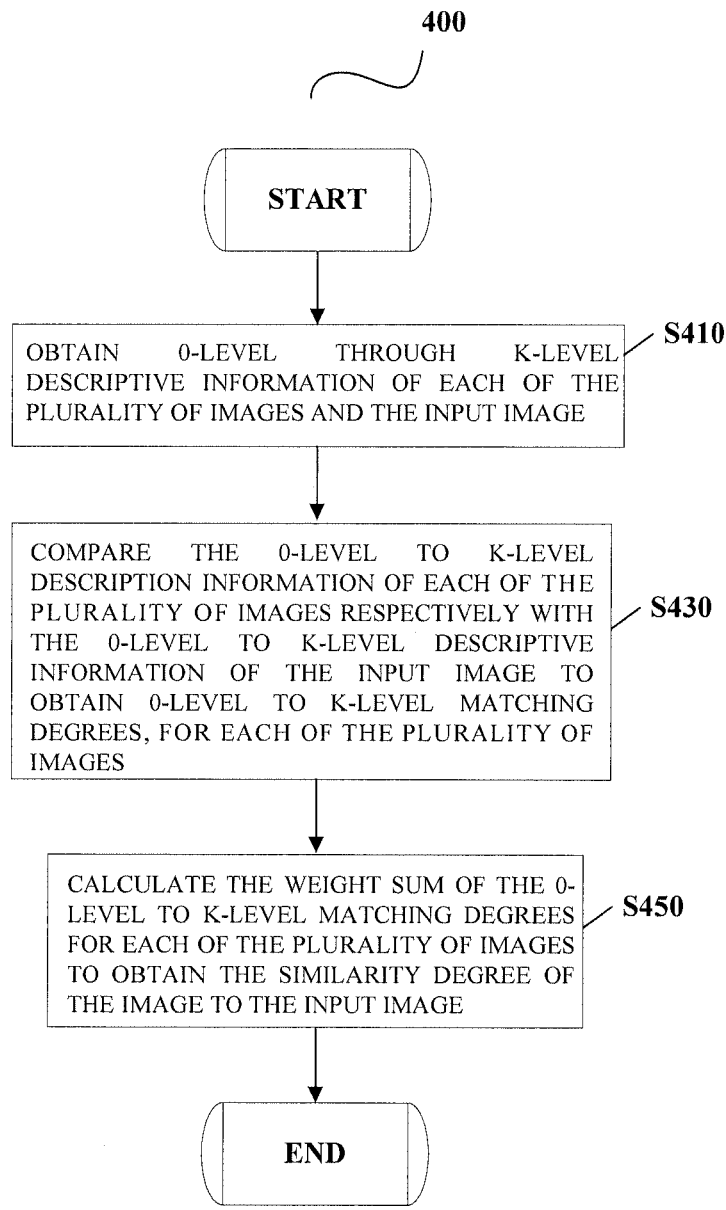
FIG. 4 is a simplified flow chart illustrating an image matching method according to an embodiment of the invention.

On the other hand, another embodiment of the invention further provides a method for matching an input image with respective images among a plurality of images. FIG. 4 illustrates a simplified flow chart of the method 400. As illustrated in FIG. 4, 0-level through K-level descriptive information of each of the plurality of images and the input image is obtained in the step 410. The descriptive information of each of the plurality of images can be obtained in the method illustrated in FIG. 1

On the other hand, the 0-level descriptive information of the input image can be obtained in accordance with a plurality of 0-level local feature descriptors for the input image and the library of visual words obtained in the first acquisition step S130 of FIG. 1, where the plurality of 0-level local feature descriptors are obtained on the basis of a plurality of feature points included in the input image. In an embodiment, a local feature descriptor for each of the plurality of feature points of the input image is calculated so as to obtain the plurality of 0-level local feature descriptors for the input image. For example a Scale Invariant Feature Transform (SIFT) feature can be extracted in an SIFT extraction method, a shape context descriptor for the feature point can be calculated, or a statistic of a matrix of the relative positions and angular relationships between the feature point and other pixel points in the input image can be generated. Then the plurality of 0-level local feature descriptors for the input image are made correspond respectively to the corresponding visual words in the library of visual words so that the 0-level descriptive information of the input image is generated by generating a statistic of the frequencies that the respective visual words in the library of visual words appear in the input image.

Furthermore the (n−1)-level descriptive information of the input image can be obtained by performing the following steps for the input image, where n=2, 3, . . . , K+1: the input image is divided for the (n−1)th time so as to obtain a plurality of (n−1)-level sub-images; and (n−1)-level descriptive information of the input image is generated in accordance with a plurality of n-level local feature descriptors for the input image which are obtained on the basis of the plurality of feature points of the input image and with the plurality of nth visual words obtained in the nth acquisition step S150 of FIG. 1, where each of the plurality of n-level local feature descriptors are obtained in accordance with corresponding (n−1)-level sub-images of the input image where the respective feature points lie. In an embodiment, the input image is divided into a series of increasingly fine spatial grids repeatedly for a number K of times to obtain K sets of grid elements (sub-images) of the input image respectively at the first to Kth grid levels. Furthermore local feature descriptors for feature points included in each of the grid elements are calculated from the grid element at each of the grid levels to obtain local feature descriptors for the input image at the grid level. Next at each of the grid level, descriptive information of the input image at the grid level is generated from the local feature descriptors for the input image at the grid level and the library of visual words at the same grid level obtained in the nth acquisition step S150 of FIG. 1.

The process proceeds to the step S430 for comparing the 0-level to K-level description information of each of the images respectively with the 0-level to K-level description information of the input image to obtain 0-level to K-level matching degrees.

Then in the step S450, the weight sum of the 0-level to K-level matching degrees is calculated for each of the images to obtain the similarity degree of the image to the input image. Weight coefficients at the respective levels can be assigned according to the importance degrees of the respective levels.

In the method 400, the comparison of the 1-level descriptive information is performed only when the 0-level matching degree is greater than or equal to a predetermined threshold value, and the comparison of the n-level descriptive information is performed only when the (n−1)-level matching degree is greater than or equal to the predetermined threshold value.

In the image matching method according to the embodiment of the invention, an image can be matched flexibly in a sequence of from a coarse layer to a fine layer and will be matched at the mth layer only if the matching degree thereof with another image at the (m−1)th layer is greater than a predetermined threshold value.

Figure 5:
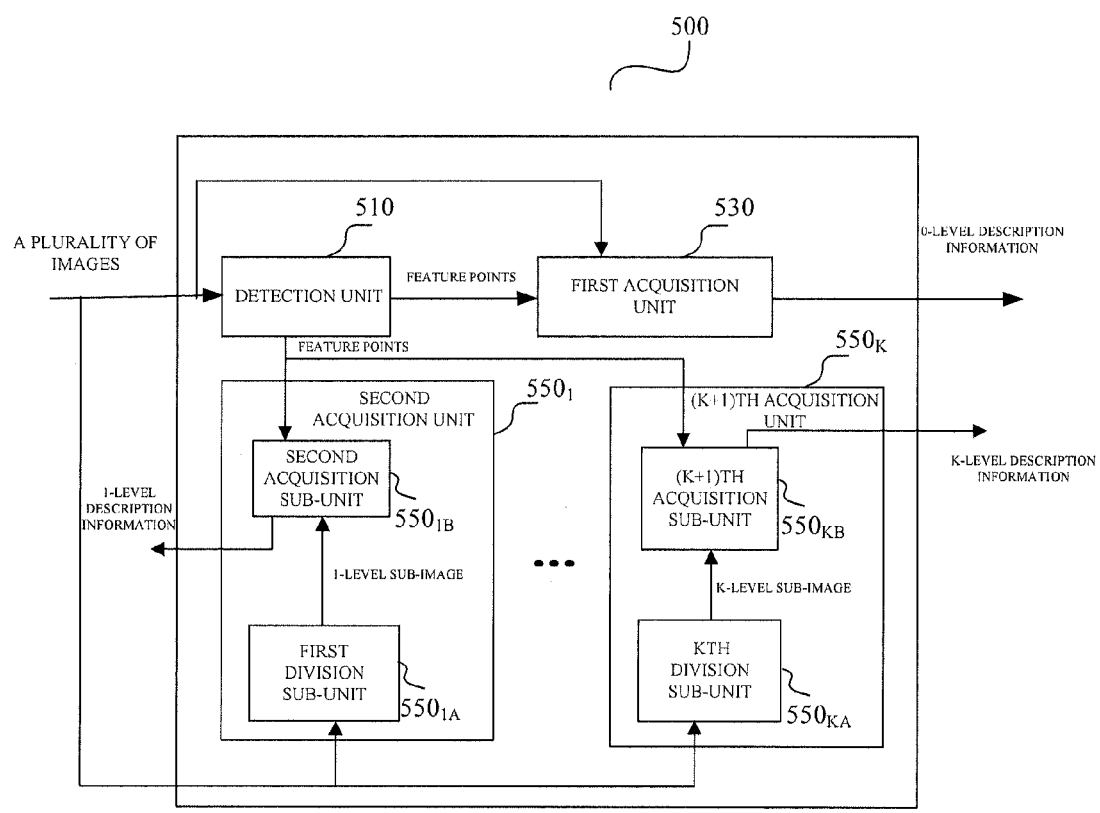
FIG. 5 is a simplified block diagram illustrating an apparatus for acquiring descriptive information of a plurality of images according to an embodiment of the invention.

FIG. 5 is a simplified block diagram illustrating an apparatus 500 for acquiring descriptive information of a plurality of images according to an embodiment of the invention. As illustrated in FIG. 5, the apparatus 500 includes a detection unit 510, a first acquisition unit 530 and a second acquisition unit $550_1$ to a (K+1)th acquisition unit $550_K$. Particularly each of the second acquisition unit $550_1$ to the (K+1)th acquisition unit $550_K$ includes a corresponding division sub-unit and acquisition sub-unit. As illustrated in FIG. 5, the second acquisition unit $550_1$ includes a first division sub-unit $550_{1A}$ and a second acquisition sub-unit $550_{1B}$; and the (K+1)th acquisition unit $550_K$ includes a Kth division sub-unit $550_{KA}$ and a (K+1)th acquisition sub-unit $550_{KB}$. In operation, the detection unit 510 performs feature point detection for the input plurality of images so as to extract a plurality of feature points for each of the images. The first acquisition unit 530 obtains local feature descriptors for each of the input plurality of images according to the extracted feature points and the image, obtains a plurality of first visual word according to the local feature descriptors for the respective images and generates, for each of the images, 0-level descriptive information of the image in accordance with the local feature descriptors for the image and the plurality of first visual words. Each of the first division sub-unit $550_{1A}$ through the Kth division sub-unit $550_{KA}$ divides the input plurality of images so that each of the images is divided into a plurality of 1-level to Kth level sub-images. Each of the second acquisition sub-unit $550_{1B}$ through the (K+1)th acquisition sub-unit $550_{KB}$ receives the feature points extracted by the detection unit 510. The second acquisition sub-unit $550_{1B}$ receives the 1-level sub-image from the first division sub-unit $550_{1A}$. Similarly the (K+1)th acquisition sub-unit $550_{KB}$ receives the K-level sub-image from the Kth division sub-unit $550_{KA}$. For each of the images, the second acquisition sub-unit $550_{1B}$ obtains a 1-level local feature descriptor for the image according to the received feature points of the image and the 1-level sub-image of the image. Then the second acquisition sub-unit $550_{1B}$ obtains a plurality of second visual words according to the 1-level local feature descriptors for the respective images and generates, for each of the images, 1-level descriptive information of the image according to the 1-level local feature descriptor for the image and the plurality of second visual words. Similarly the (K+1)th acquisition sub-unit $550_{KB}$ obtains K-level descriptive information of the plurality of images.

The apparatus 500 illustrated in FIG. 5 and the respective units 510 to 550 included therein can be configured to perform the various operations described above with reference to FIG. 1 and FIG. 2. For further details of these operations, reference can be made to the respective embodiments, implementations and examples described above, and a repeated description thereof will be omitted here.

The different implementations of the apparatus and/or method according to the embodiments of the invention have been set forth in the foregoing detailed description of the forgoing block diagrams, flow charts and/or embodiments. When one or more functions and/or operations are included in these block diagrams, flow charts and/or embodiments, those skilled in the art shall appreciate that the respective functions and/or operations in these block diagrams, flow charts and/or embodiments can be embodied separately and/or in combination in various hardware, software, firmware or virtually any combination thereof. In an implementation, some parts of the subject matter described in this specification can be embodied in an Application Specific Integrated Circuit (ASIC), a Field Programmable Gate Array (FPGA), a Digital Signal Processor (DSP) or other integrated form. However those skilled in the art will appreciate that some aspects of the implementations described in this specification can be wholly or partially embodied effectively in an integrated circuit in the form of one or more computer programs run on one or more computers (for example, in the form of one or more computer programs run on one or more computer systems), in the form of one or more programs run on one or more processors (for example, in the form of one or more programs run on one or more microprocessors), in the form of firmware or in the form of virtually any combination thereof. Furthermore those skilled in the art can design a circuit for this disclosure and/or write codes for the software and/or firmware of this disclosure in light of the discourse in this specification.

For example the foregoing apparatus 500 and the respective constituent modules, unit and sub-units can be configured in software, firmware, hardware or any combination thereof. In the case of being embodied in software or firmware, a program constituting the software can be installed from a storage medium or a network to a computer with a dedicated hardware structure (e.g., a general-purpose computer 600 illustrated in FIG. 6), which can perform various functions when various programs are installed thereon.

Figure 6:
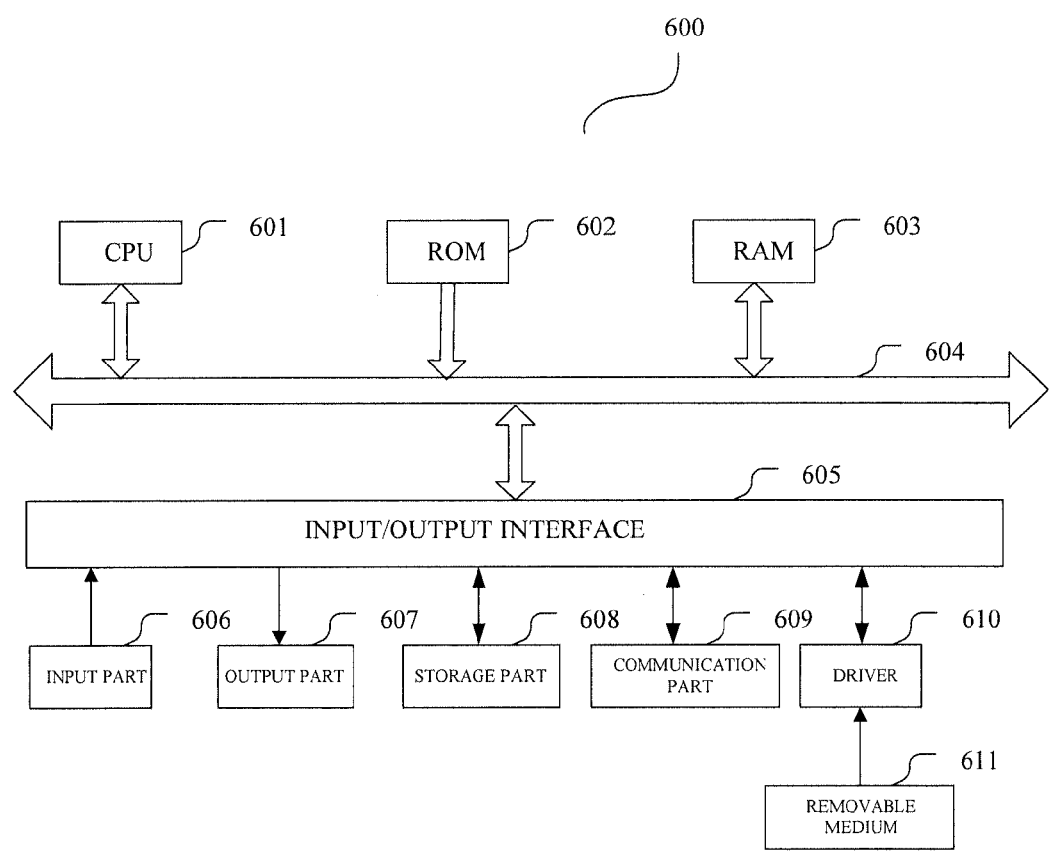
FIG. 6 is a schematic block diagram illustrating a computer in which the method and the device according to the embodiments of the invention can be embodied.

FIG. 6 illustrates a schematic block diagram of a computer in which the method and apparatus according to the embodiments of the invention can be embodied.

In FIG. 6, a Central Processing Unit (CPU) 601 performs various processes according to a program stored in a Read Only Memory (ROM) 602 or loaded from a storage part 608 into a Random Access Memory (RAM) 603 in which data required when the CPU 601 performs the various processes is also stored as needed. The CPU 601, the ROM 602 and the RAM 603 are connected to each other via a bus 604 to which an input/output interface 605 is also connected.

The following components are connected to the input/output interface 605: an input part 606 (including a keyboard, a mouse, etc.), an output part 607 (including a display, e.g., a Cathode Ray Tube (CRT), a Liquid Crystal Display (LCD), etc., a speaker, etc.), a storage port 608 (including a hard disk, etc.) and a communication part 609 (including a network interface card, e.g., an LAN card, a modem, etc.). The communication part 609 performs a communication process over a network, e.g., the Internet. A driver 610 can also connected to the input/output interface 605. A removable medium 611, e.g., a magnetic disk, an optical disk, an optic-magnetic disk, a semiconductor memory, etc., can be installed on the driver 610 as needed so that a computer program fetched therefrom can be installed into the storage part 608 as needed.

In the case that the foregoing series of processes are performed in software, a program constituting the software is installed from a network, e.g., the Internet, etc., or a storage medium, e.g., the removable medium 611, etc.

Those skilled in the art shall appreciate that such a storage medium will not be limited to the removable medium 611 illustrated in FIG. 6 in which the program is stored and which is distributed separately from the apparatus to provide a user with the program. Examples of the removable medium 611 include a magnetic disk (including a Floppy Disk), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 602, the hard disk included in the storage port 608, etc., in which the program is stored and which is distributed together with the apparatus including the same to the user.

Therefore the invention further proposes a program product in which machine readable instruction codes are stored. The instruction codes can perform the various methods according to the embodiments of the invention described above when being read and executed by a machine. Correspondingly various storage mediums in which such a program product is borne will also be encompassed in the disclosure of the invention.

In the foregoing description of the embodiments of the invention, a feature described and/or illustrated in connection with one embodiment can be used in the same or similar way in one or more embodiments in combination with or in place of a feature in the other embodiment(s).

It shall be emphasized that the terms "include/comprise" and any other variants thereof as used in this context refer to presence of a feature, an element, a step or a component but will not exclude presence or addition of one or more other features, elements, steps or components.

Furthermore the method according to the invention will not be performed only in the temporal sequence described in the specification but can also be performed in another temporal sequence, in parallel or separately. Therefore the scope of the invention will be not limited to the sequence in which the method is performed as described in this specification.

Although the invention has been disclosed in the foregoing description of the embodiments of the invention, it shall be appreciated that those skilled in the art can devise various modifications, adaptations or equivalents of the invention without departing from the spirit and scope of the invention. These modifications, adaptations or equivalents shall also be constructed as falling into the scope of the invention.

As can be apparent from the foregoing description of the embodiments of the invention, the technical solution according to the invention includes but will not be limited to what described in the following Annexes:

Annex 1. A method for acquiring descriptive information of a plurality of images, comprising:

a detection step for performing a feature point detection with respect to each image of the plurality of images, so as to obtain a plurality of feature points of each image;

a first acquisition step for acquiring 0-level descriptive information of the plurality of images, wherein the 0-level descriptive information of each image of the plurality of images is generated in accordance with a plurality of first local feature descriptors for the image and a plurality of first visual words, wherein the plurality of first local feature descriptors are obtained on the basis of the plurality of feature points of the image and the plurality of first visual words are obtained on the basis of the plurality of first local feature descriptors for the plurality of images; and an nth acquisition step for acquiring (n−1)-level descriptive information of the plurality of images, wherein the following steps are performed for each image:
   an (n−1)th division sub-step, for performing a division of the image for the (n−1)th time, so as to obtain a plurality of (n−1)-level sub-images of the image; and
   an nth acquisition sub-step, in which (n−1)-level descriptive information of the image is generated in accordance with a plurality of nth local feature descriptors for the image and a plurality of nth visual words, wherein the plurality of nth local feature descriptors are obtained on the basis of the plurality of feature points of the image, the plurality of nth visual words are obtained on the basis of the plurality of nth local feature descriptors for the plurality of images, and each of the nth local feature descriptors for the image are obtained in accordance with corresponding (n−1)-level sub-images where the respective feature points lie, where n=2,3, . . . , K+1, and K is a positive integer.

Annex 2. The method according to Annex 1, wherein the generation of 0-level descriptive information of the image comprises:

a first calculation sub-step, for calculating a first local feature descriptor for each of the plurality of feature points of the image, so as to obtain the plurality of first local feature descriptors for the image; and a first descriptive information generation sub-step, for making the plurality of first local feature descriptors for the image correspond to the corresponding first visual words among the plurality of first visual words, respectively, so as to generate 0-level descriptive information of the image through statistics of a frequency of appearance in the image for each of the plurality of first visual words.

Annex 3. The method according to Annex 1 or 2, wherein the nth acquisition sub-step comprises:

an nth calculation sub-step for calculating an nth local feature descriptor for each feature point of the plurality of feature points of the image based on an (n−1)-level sub-image where the feature point lies, so as to obtain the plurality of nth local feature descriptors for the image; and an nth descriptive information generation sub-step, comprising: making the nth local feature descriptor for each of the plurality of feature points of the image corresponds to a corresponding nth visual word among the plurality of nth visual words, so as to generate, for each (n−1)-level sub-image of the image, descriptive information of the (n−1)-level sub-image through statistics of a frequency of appearance in the (n−1)-level sub-image for each of the plurality of nth visual words; and combining descriptive information of the plurality of (n−1)-level sub-images so as to generate the (n−1)-level descriptive information of the image.

Annex 4. The method according to one of Annexes 1-3, wherein the obtainment of the plurality of first visual words includes clustering the plurality of first local feature descriptors for the plurality of images, and the obtainment of the plurality of nth visual words includes clustering the plurality of nth local feature descriptors for the plurality of images.

Annex 5. The method according to one of Annexes 1-4, wherein the plurality of first local feature descriptors and the plurality of nth local feature descriptors include one of Scale Invariant Feature Transform (SIFT) descriptors, shape context descriptors, and relative position and angular relationship matrix descriptors.

Annex 6. An image matching method, comprising obtaining a plurality of similarity degrees by matching an input image with each of a plurality of images, respectively, in which the obtainment of each similarity degree comprising: comparing 0-level descriptive information through K-level descriptive information of the input image with 0-level descriptive information through K-level descriptive information of a corresponding image among the plurality of images respectively, so as to obtain a plurality of matching degrees including a 0-level matching degree through a K-level matching degree; and obtaining the similarity degree in accordance with a weighted sum of the plurality of matching degrees, where K is a positive integer, wherein the 0-level descriptive information through K-level descriptive information of each of the plurality of images are obtained by the method according to one of Annexes 1-5;

the 0-level descriptive information of the input image is obtained in accordance with a plurality of 0-level local feature descriptors for the input image and the plurality of first visual words, in which the plurality of 0-level local feature descriptors are obtained on the basis of a plurality of feature points included in the input image;

(n−1)-level descriptive information of the input image is obtained by performing the following steps for the input image, where n=2, 3, . . . , K+1:

dividing the input image for the (n−1)th time, so as to obtain a plurality of (n−1)-level sub-images; and generating (n−1)-level descriptive information of the input image in accordance with the plurality of nth visual words and a plurality of n-level local feature descriptors for the input image which are obtained on the basis of the plurality of feature points of the input image, wherein each of the plurality of n-level local feature descriptors are obtained in accordance with corresponding (n−1)-level sub-images where the respective feature points lie, and the comparison of 1-level descriptive information is performed only when the 0-level matching degree is greater than or equal to a predetermined threshold value, and the comparison of n-level descriptive information is performed only when an (n−1)-level matching degree is greater than or equal to the predetermined threshold value.

Annex 7. The method according to Annex 6, wherein obtaining the 0-level descriptive information of the input image comprises: calculating a 0-level local feature descriptor for each of the plurality of feature points included in the input image, so as to obtain the plurality of 0-level local feature descriptors for the input image; and making the plurality of 0-level local feature descriptors for the input image correspond to corresponding first visual words among the plurality of first visual words, so as to generate 0-level descriptive information of the input image through statistics of a frequency of appearance in the input image for each of the plurality of first visual words; and generating (n−1)-level descriptive information of the input image in accordance with the plurality of n-level local feature descriptors and the plurality of nth visual words comprises:

calculating an n-level local feature descriptor for each of the plurality of feature points of the input image based on the (n−1)-level sub-image where the feature point lies, so as to obtain the plurality of n-level local feature descriptors for the input image;

making the n-level local feature descriptor for each of the plurality of feature points of the input image corresponds to a corresponding nth visual word among the plurality of nth visual words, so as to generate, for each (n−1)-level sub-image of the input image, descriptive information of the (n−1)-level sub-image through statistics of a frequency of appearance in the (n−1)-level sub-image for each of the plurality of nth visual words; and combining descriptive information of the plurality of (n−1)-level sub-images so as to generate the (n−1)-level descriptive information of the input image.

Annex 8. An apparatus for acquiring descriptive information of a plurality of images, comprising:

a detection unit configured to perform a feature point detection for each image of the plurality of images, so as to obtain a plurality of feature points of each image;

a first acquisition unit for acquiring 0-level descriptive information of the plurality of images, configured to generate, for each image, the 0-level descriptive information of the image in accordance with a plurality of first local feature descriptors for the image and a plurality of first visual words, wherein the plurality of first local feature descriptors are obtained on the basis of the plurality of feature points of the image, and the plurality of first visual words are obtained on the basis of the plurality of first local feature descriptors for the plurality of images; and an nth acquisition unit for acquiring (n−1)-level descriptive information of the plurality of images, comprising:

an (n−1)th division sub-unit configured to perform, for each image, a division of the image for the (n−1)th time, so as to obtain a plurality of (n−1)-level sub-images of the image; and an nth acquisition sub-unit configured to generate, for each image, (n−1)-level descriptive information of the image in accordance with a plurality of nth local feature descriptors for the image and a plurality of nth visual words, wherein each of the plurality of nth local feature descriptors are obtained on the basis of respective feature points of the image and corresponding (n−1)-level sub-images where the respective feature points lie, and the plurality of nth visual words are obtained on the basis of the plurality of nth local feature descriptors for the plurality of images, where n=2,3, . . . , K+1, and K is a positive integer.

Annex 9. The apparatus according to Annex 8, wherein the first acquisition unit comprises:

a first calculation sub-unit configured to calculate, for each image, a first local feature descriptor for each of the plurality of feature points of the image, so as to obtain the plurality of first local feature descriptors for the image; and a first descriptive information generation sub-unit configured to make, for each image, the plurality of first local feature descriptors for the image correspond to the corresponding first visual words among the plurality of first visual words, respectively, so as to generate 0-level descriptive information of the image through statistics of a frequency of appearance in the image for each of the plurality of first visual words.

Annex 10. The apparatus according to Annex 8 or 9, wherein the nth acquisition sub-unit comprises:

an nth calculation sub-unit configured to calculate, for each image, an nth local feature descriptor for each feature point of the plurality of feature points of the image in accordance with an (n−1)-level sub-image where the feature point lies, so as to obtain the plurality of nth local feature descriptors for the image; and an nth descriptive information generation sub-unit configured to perform the following operations for each image: making the nth local feature descriptor for each of the plurality of feature points of the image corresponds to a corresponding nth visual word among the plurality of nth visual words, so as to generate descriptive information of each (n−1)-level sub-image of the image through statistics of a frequency of appearance in the (n−1)-level sub-image for each of the plurality of nth visual words; and combining descriptive information of the plurality of (n−1)-level sub-images so as to generate the (n−1)-level descriptive information of the image.

Annex 11. The apparatus according to one of Annexes 8-10, wherein the first acquisition unit is configured to obtain the plurality of first visual words by clustering the plurality of first local feature descriptors for the plurality of images, and the nth acquisition unit is configured to obtain the plurality of nth visual words by clustering the plurality of nth local feature descriptors for the plurality of images.

Annex 12. The apparatus according to one of Annexes 8-11, wherein the plurality of first local feature descriptors and the plurality of nth local feature descriptors include one of scale invariant feature transform (SIFT) descriptors, shape context descriptors, and relative position and angular relationship matrix descriptors.

Annex 13. The apparatus according to one of Annexes 8-12, further comprising:

a first information acquisition unit for acquiring 0-level information of an input image, configured to acquire 0-level information of the input image in accordance with a plurality of 0-level local feature descriptors for the input image and the plurality of first visual words, wherein the plurality of 0-level local feature descriptors are obtained on the basis of a plurality of feature points included in the input image;

an nth information acquisition unit for acquiring (n−1)-level descriptive information of the input image, where n=2, 3, . . . , K+1, comprising:

an (n−1)th division sub-unit configured to divide the input image for the (n−1)th time, so as to obtain a plurality of (n−1)-level sub-images; and an nth information generation sub-unit configured to generate (n−1)-level descriptive information of the input image in accordance with the plurality of nth visual words and a plurality of n-level local feature descriptors for the input image which are obtained in accordance with the plurality of feature points of the input image, wherein, each of the plurality of n-level local feature descriptors are obtained in accordance with corresponding (n−1)-level sub-images where the respective feature points lie, and an image matching unit configured to obtain a plurality of similarity degrees by matching the input image with each of a plurality of images respectively, comprising:

a comparison sub-unit configured to compare, for each image of the plurality of images, 0-level descriptive information through K-level descriptive information of the input image with 0-level descriptive information through K-level descriptive information of the image respectively, so as to obtain the plurality of matching degrees including a 0-level matching degree through a K-level matching degree; and a similarity degree generation unit configured to obtain the similarity degree of each image in accordance with a weighting sum of the plurality of matching degrees of the image, where K is a positive integer, wherein the comparison of 1-level descriptive information is performed only when the 0-level matching degree is greater than or equal to a predetermined threshold value, and the comparison of n-level descriptive information is performed only when an (n−1)-level matching degree is greater than or equal to the predetermined threshold value.

Annex 14. The apparatus according to Annex 13, wherein the first information acquisition unit is configured to perform the following operations: calculating a 0-level local feature descriptor for each of the plurality of feature points included in the input image, so as to obtain the plurality of 0-level local feature descriptors for the input image; and making the plurality of 0-level local feature descriptors for the input image correspond to corresponding first visual words among the plurality of first visual words, respectively, so as to generate 0-level descriptive information of the input image through statistics of a frequency of appearance in the input image for each of the plurality of first visual words; and the nth information generation sub-unit is configured to perform the following operations: calculating an n-level local feature descriptor for each of the plurality of feature points of the input image based on the (n−1)-level sub-image where the feature point lies, so as to obtain the plurality of n-level local feature descriptors for the input image; and making the n-level local feature descriptor for each of the plurality of feature points of the input image corresponds to the a corresponding nth visual word among the plurality of nth visual words, so as to generate descriptive information of each (n−1)-level sub-image of the input image through statistics of a frequency of appearance in the (n−1)-level sub-image for each of the plurality of nth visual words; and combining descriptive information of the plurality of (n−1)-level sub-images so as to generate the (n−1)-level descriptive information of the input image.

Annex 15. A program product storing a machine-readable instruction code, wherein:

the method according to any one of Annexes 1-7 can be executed when the instruction code is read and performed by the machine.

Annex 16. A storage medium carrying the program product according to Annex 15.

The invention claimed is:

1. A method for acquiring descriptive information of a plurality of images, comprising:

performing a feature point detection with respect to each image of the plurality of images, so as to obtain a plurality of feature points of each image;

acquiring 0-level descriptive information of the plurality of images, wherein the 0-level descriptive information of each image of the plurality of images is generated in accordance with a plurality of first local feature descriptors for the image and a plurality of first visual words, wherein the plurality of first local feature descriptors are obtained on the basis of the plurality of feature points of the image and the plurality of first visual words are obtained on the basis of the plurality of first local feature descriptors for the plurality of images; and acquiring (n−1)-level descriptive information of the plurality of images, wherein the following are performed for each image:

performing a division of the image for the (n−1)th time, so as to obtain a plurality of (n−1)-level sub-images of the image;

obtaining a plurality of nth local feature descriptors for the image by obtaining nth local feature descriptors for the image at the (n−1)-level sub-images in accordance with corresponding (n−1)-level sub-images where the respective feature points lie;

clustering local feature descriptors for all the image at the (n−1)-level sub-images, to generate a plurality of nth visual words for the (n−1)-level sub-images; and generating (n−1)-level descriptive information of the image in accordance with the plurality of nth local feature descriptors and the plurality of nth visual words;

wherein the nth visual words are different from the (n−1)th visual words, where n=2,3, . . . , K+1, and K is a positive integer.

2. The method according to claim 1, wherein the generation of 0-level descriptive information of the image with respect to each image comprises:

calculating a first local feature descriptor for each of the plurality of feature points of the image, so as to obtain the plurality of first local feature descriptors for the image; and making the plurality of first local feature descriptors for the image correspond to the corresponding first visual words among the plurality of first visual words, respectively, so as to generate 0-level descriptive information of the image through statistics of a frequency of appearance in the image for each of the plurality of first visual words.

3. The method according to claim 1, wherein the nth acquisition comprises:

calculating an nth local feature descriptor for each feature point of the plurality of feature points of the image based on an (n−1)-level sub-image where the feature point lies, so as to obtain the plurality of nth local feature descriptors for the image; and making the nth local feature descriptor for each of the plurality of feature points of the image corresponds to a corresponding nth visual word among the plurality of nth visual words, so as to generate, for each (n−1)-level sub-image of the image, descriptive information of the (n−1)-level sub-image through statistics of a frequency of appearance in the (n−1)-level sub-image for each of the plurality of nth visual words; and combining descriptive information of the plurality of (n−1)-level sub-images so as to generate the (n−1)-level descriptive information of the image.

4. The method according to claim 1, wherein the obtainment of the plurality of first visual words includes clustering the plurality of first local feature descriptors for the plurality of images, and the obtainment of the plurality of nth visual words includes clustering the plurality of nth local feature descriptors for the plurality of images.

5. The method according to claim 1, wherein the plurality of first local feature descriptors and the plurality of nth local feature descriptors include one of Scale Invariant Feature Transform (SIFT) descriptors, shape context descriptors, and relative position and angular relationship matrix descriptors.

6. An image matching method, comprising obtaining a plurality of similarity degrees by matching an input image with each of a plurality of images, respectively, in which the obtainment of each similarity degree comprising: comparing 0-level descriptive information through K-level descriptive information of the input image with 0-level descriptive information through K-level descriptive information of a corresponding image among the plurality of images respectively, so as to obtain a plurality of matching degrees including a 0-level matching degree through a K-level matching degree; and obtaining the similarity degree in accordance with a weighted sum of the plurality of matching degrees, where K is a positive integer, wherein the 0-level descriptive information through K-level descriptive information of each of the plurality of images are obtained by the method according to claim 1;

the 0-level descriptive information of the input image is obtained in accordance with a plurality of 0-level local feature descriptors for the input image and the plurality of first visual words, in which the plurality of 0-level local feature descriptors are obtained on the basis of a plurality of feature points included in the input image;

(n−1)-level descriptive information of the input image is obtained by performing the following steps for the input image, where n=2, 3, . . . , K+1:

dividing the input image for the (n−1)th time, so as to obtain a plurality of (n−1)-level sub-images; and generating (n−1)-level descriptive information of the input image in accordance with the plurality of nth visual words and a plurality of n-level local feature descriptors for the input image which are obtained on the basis of the plurality of feature points of the input image, wherein each of the plurality of n-level local feature descriptors are obtained in accordance with corresponding (n−1)-level sub-images of the input image where the respective feature points lie, and the comparison of 1-level descriptive information is performed only when the 0-level matching degree is greater than or equal to a predetermined threshold value, and the comparison of n-level descriptive information is performed only when an (n−1)-level matching degree is greater than or equal to the predetermined threshold value, wherein the nth visual words are different from (n−1)th visual words.

7. The method according to claim 6, wherein obtaining the 0-level descriptive information of the input image comprises: calculating a 0-level local feature descriptor for each of the plurality of feature points included in the input image, so as to obtain the plurality of 0-level local feature descriptors for the input image; and making the plurality of 0-level local feature descriptors for the input image correspond to corresponding first visual words among the plurality of first visual words, so as to generate 0-level descriptive information of the input image through statistics of a frequency of appearance in the input image for each of the plurality of first visual words; and generating (n−1)-level descriptive information of the input image in accordance with the plurality of n-level local feature descriptors and the plurality of nth visual words comprises:

calculating an n-level local feature descriptor for each of the plurality of feature points of the input image based on the (n−1)-level sub-image where the feature point lies, so as to obtain the plurality of n-level local feature descriptors for the input image;

making the n-level local feature descriptor for each of the plurality of feature points of the input image correspond to a corresponding nth visual word among the plurality of nth visual words, so as to generate, for each (n−1)-level sub-image of the input image, descriptive information of the (n−1)-level sub-image through statistics of a frequency of appearance in the (n−1)-level sub-image for each of the plurality of nth visual words; and combining descriptive information of the plurality of (n−1)-level sub-images so as to generate the (n−1)-level descriptive information of the input image, wherein the nth visual words are different from (n−1)th visual words.

8. An apparatus for acquiring descriptive information of a plurality of images, comprising:

a detection unit configured to perform a feature point detection for each image of the plurality of images, so as to obtain a plurality of feature points of each image;

a first acquisition unit for acquiring 0-level descriptive information of the plurality of images, configured to generate, for each image, the 0-level descriptive information of the image in accordance with a plurality of first local feature descriptors for the image and a plurality of first visual words, wherein the plurality of first local feature descriptors are obtained on the basis of the plurality of feature points of the image, and the plurality of first visual words are obtained on the basis of the plurality of first local feature descriptors for the plurality of images; and an nth acquisition unit for acquiring (n−1)-level descriptive information of the plurality of images, comprising:

an (n−1)th division sub-unit configured to perform, for each image, a division of the image for the (n−1)th time, so as to obtain a plurality of (n−1)-level sub-images of the image; and an nth acquisition sub-unit comprising:

an nth local feature descriptors an nth local feature descriptors obtaining section, for obtaining a plurality of nth local feature descriptors for the image by obtaining nth local feature descriptors for the image at the (n−1)-level sub-images in accordance with corresponding (n−1)-level sub-images where the respective feature points lie;

an (n−1)-level sub-images generating section, for clustering the local feature descriptors for all the image at the (n−1)-level sub-images, to generate a plurality of nth visual words for the (n−1)-level sub-images;

an (n−1)-level descriptive information generating section, for generating (n−1)-level descriptive information of the image in accordance with the plurality of the nth local feature descriptors and the plurality of nth visual words;

wherein the nth visual words are different from the (n−1)th visual words, where n=2,3, ..., K+1, and K is a positive integer.

9. The apparatus according to claim 8, wherein the first acquisition unit comprises:

a first calculation sub-unit configured to calculate, for each image, a first local feature descriptor for each of the plurality of feature points of the image, so as to obtain the plurality of first local feature descriptors for the image; and a first descriptive information generation sub-unit configured to make, for each image, the plurality of first local feature descriptors for the image correspond to the corresponding first visual words among the plurality of first visual words, respectively, so as to generate 0-level descriptive information of the image through statistics of a frequency of appearance in the image for each of the plurality of first visual words.

10. The apparatus according to claim 8, wherein the nth acquisition sub-unit comprises:

an nth calculation sub-unit configured to calculate, for each image, an nth local feature descriptor for each feature point of the plurality of feature points of the image in accordance with an (n−1)-level sub-image where the feature point lies, so as to obtain the plurality of nth local feature descriptors for the image; and an nth descriptive information generation sub-unit configured to perform the following operations for each image: making the nth local feature descriptor for each of the plurality of feature points of the image correspond to a corresponding nth visual word among the plurality of nth visual words, so as to generate descriptive information of each (n−1)-level sub-image of the image through statistics of a frequency of appearance in the (n−1)-level sub-image for each of the plurality of nth visual words; and combining descriptive information of the plurality of (n−1)-level sub-images so as to generate the (n−1)-level descriptive information of the image.

11. The apparatus according to claim 8, wherein the first acquisition unit is configured to obtain the plurality of first visual words by clustering the plurality of first local feature descriptors for the plurality of images, and the nth acquisition unit is configured to obtain the plurality of nth visual words by clustering the plurality of nth local feature descriptors for the plurality of images.

12. The apparatus according to claim 8, wherein the plurality of first local feature descriptors and the plurality of nth local feature descriptors include one of scale invariant feature transform (SIFT) descriptors, shape context descriptors, and relative position and angular relationship matrix descriptors.

13. The apparatus according to claim 8, further comprising:

a first information acquisition unit for acquiring 0-level information of an input image, configured to acquire 0-level information of the input image in accordance with a plurality of 0-level local feature descriptors for the input image and the plurality of first visual words, wherein the plurality of 0-level local feature descriptors are obtained on the basis of a plurality of feature points included in the input image;

an nth information acquisition unit for acquiring (n−1)-level descriptive information of the input image, where n=2, 3, ..., K+1, comprising:

an (n−1)th division sub-unit configured to divide the input image for the (n−1)th time, so as to obtain a plurality of (n−1)-level sub-images; and an nth information generation sub-unit configured to generate (n−1)-level descriptive information of the input image in accordance with the plurality of nth visual words and a plurality of n-level local feature descriptors for the input image which are obtained in accordance with the plurality of feature points of the input image, wherein, each of the plurality of n-level local feature descriptors are obtained in accordance with corresponding (n−1)-level sub-images where the respective feature points lie, and an image matching unit configured to obtain a plurality of similarity degrees by matching the input image with each of a plurality of images respectively, comprising:

a comparison sub-unit configured to compare, for each image of the plurality of images, 0-level descriptive information through K-level descriptive information of the input image with 0-level descriptive information through K-level descriptive information of the image respectively, so as to obtain the plurality of matching degrees including a 0-level matching degree through a K-level matching degree; and a similarity degree generation unit configured to obtain the similarity degree of each image in accordance with a weighting sum of the plurality of matching degrees of the image, where K is a positive integer, wherein the comparison of 1-level descriptive information is performed only when the 0-level matching degree is greater than or equal to a predetermined threshold value, and the comparison of n-level descriptive information is performed only when an (n−1)-level matching degree is greater than or equal to the predetermined threshold value.

14. The apparatus according to claim 13, wherein the first information acquisition unit is configured to perform the following operations: calculating a 0-level local feature descriptor for each of the plurality of feature points included in the input image, so as to obtain the plurality of 0-level local feature descriptors for the input image; and making the plurality of 0-level local feature descriptors for the input image correspond to corresponding first visual words among the plurality of first visual words, respectively, so as to generate 0-level descriptive information of the input image through statistics of a frequency of appearance in the input image for each of the plurality of first visual words; and the nth information generation sub-unit is configured to perform the following operations: calculating an n-level local feature descriptor for each of the plurality of feature points of the input image based on the (n−1)-level sub-image where the feature point lies, so as to obtain the plurality of n-level local feature descriptors for the input image; and making the n-level local feature descriptor for each of the plurality of feature points of the input image corresponds to the a corresponding nth visual word among the plurality of nth visual words, so as to generate descriptive information of each (n−1)-level sub-image of the input image through statistics of a frequency of appearance in the (n−1)-level sub-image for each of the plurality of nth visual words; and combining descriptive information of the plurality of (n−1)-level sub-images so as to generate the (n−1)-level descriptive information of the input image.

15. The method of claim 1 embodied in a non-transitory computer readable storage program product storing machine readable instruction code, which when read and executed by a machine, the instruction code executes the method of acquiring descriptive information of a plurality of images.

16. A non-transitory machine readable storage medium storing an instruction code, which when executed by a machine, cause the performance of the method of claim 1.

* * * * *

UNITED STATES PATENT AND TRADEMARK OFFICE
CERTIFICATE OF CORRECTION

Page 1 of 1

PATENT NO. : 8,923,623 B2
APPLICATION NO. : 13/434065
DATED : December 30, 2014
INVENTOR(S) : Qiong Cao et al.

It is certified that error appears in the above-identified patent and that said Letters Patent is hereby corrected as shown below:

In the Claims

Column 20, line 18, in claim 14, delete "the a corresponding" and insert -- the corresponding --, therefor.

Signed and Sealed this
Seventh Day of July, 2015

Michelle K. Lee
*Director of the United States Patent and Trademark Office*